US011472386B2

(12) United States Patent
Sagayama

(10) Patent No.: US 11,472,386 B2
(45) Date of Patent: Oct. 18, 2022

(54) HYDRAULIC PRESSURE CONTROL UNIT FOR STRADDLE-TYPE VEHICLE BRAKE SYSTEM AND STRADDLE-TYPE VEHICLE BRAKE SYSTEM

(71) Applicant: Robert Bosch GmbH, Stuttgart (DE)

(72) Inventor: Kosaku Sagayama, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 17/050,736

(22) PCT Filed: Apr. 5, 2019

(86) PCT No.: PCT/IB2019/052801
§ 371 (c)(1),
(2) Date: Oct. 26, 2020

(87) PCT Pub. No.: WO2019/207386
PCT Pub. Date: Oct. 31, 2019

(65) Prior Publication Data
US 2021/0114571 A1    Apr. 22, 2021

(30) Foreign Application Priority Data

Apr. 25, 2018   (JP) .............................. JP2018-084494

(51) Int. Cl.
*B60T 8/40* (2006.01)
*B60T 8/32* (2006.01)
(Continued)

(52) U.S. Cl.
CPC .......... *B60T 8/3225* (2013.01); *B60T 8/4031* (2013.01); *B60T 13/145* (2013.01); *B60T 15/028* (2013.01);
(Continued)

(58) Field of Classification Search
CPC ...... B60T 8/368; B60T 8/3675; B60T 8/3685; B60T 13/686; B60T 17/02; B60T 8/363;
(Continued)

(56) References Cited

U.S. PATENT DOCUMENTS

2006/0138860 A1\* 6/2006 Hinz ..................... B60T 8/4081
303/DIG. 10
2007/0110590 A1\* 5/2007 Pabst .................... B60T 8/4072
417/273
(Continued)

FOREIGN PATENT DOCUMENTS

CN      102015391 A    4/2011
CN      104936838 A    9/2015
(Continued)

OTHER PUBLICATIONS

International Search Report and Written Opinion for Application No. PCT/IB2019/052801 dated Jul. 26, 2019 (12 pages).

*Primary Examiner* — Robert A. Siconolfi
*Assistant Examiner* — Stephen M Bowes
(74) *Attorney, Agent, or Firm* — Michael Best & Friedrich LLP

(57) ABSTRACT

To acquire a hydraulic pressure control unit and a straddle-type vehicle brake system capable of adding an auxiliary plunger pump while suppressing extreme enlargement of the hydraulic pressure control unit.
In a base body, a combination of a first plunger pump and a first accumulator and a combination of a second plunger pump and a second accumulator for a different system of a hydraulic circuit therefrom are separately provided on both sides of a reference surface including a center axis of a motor hole. A first plunger pump hole and a second plunger pump hole are separately provided on a second surface and a third surface constituting both ends of the base body in a first direction. A first accumulator hole, a second accumulator hole, and an auxiliary plunger pump hole are provided on a fourth surface constituting an end of the base body in a second direction.

12 Claims, 7 Drawing Sheets

(51) Int. Cl.
  *B60T 13/14* (2006.01)
  *B60T 15/02* (2006.01)
  *B60T 17/02* (2006.01)
  *B60T 17/04* (2006.01)
(52) U.S. Cl.
  CPC .............. *B60T 17/02* (2013.01); *B60T 17/04* (2013.01); *B60T 2270/10* (2013.01); *B60T 2270/402* (2013.01)
(58) Field of Classification Search
  CPC .... B60T 8/4018; B60T 8/4022; B60T 8/3225; Y10S 303/10
  See application file for complete search history.

(56) References Cited

U.S. PATENT DOCUMENTS

| | | | | |
|---|---|---|---|---|
| 2007/0176484 | A1* | 8/2007 | Reuter | F04B 1/0413 303/10 |
| 2008/0298982 | A1* | 12/2008 | Pabst | B60T 8/368 417/273 |
| 2010/0231033 | A1* | 9/2010 | Gastauer | B60T 8/368 303/10 |
| 2011/0036434 | A1* | 2/2011 | Fischbach-Borazio | B60T 8/368 137/861 |
| 2013/0145758 | A1* | 6/2013 | Michalski | F04B 1/04 60/486 |
| 2015/0353065 | A1* | 12/2015 | Iyatani | B60T 13/686 303/10 |

FOREIGN PATENT DOCUMENTS

| | | |
|---|---|---|
| CN | 107901899 A | 4/2018 |
| DE | 19843910 A1 | 3/1999 |
| JP | H04317846 A | 11/1992 |
| JP | 2013244823 A | 12/2013 |
| JP | 2014024388 A | 2/2014 |
| WO | 2007023071 A1 | 3/2007 |
| WO | 2009051008 A1 | 4/2009 |
| WO | 2009081738 A1 | 7/2009 |

* cited by examiner

HYDRAULIC PRESSURE CONTROL UNIT FOR STRADDLE-TYPE VEHICLE BRAKE SYSTEM AND STRADDLE-TYPE VEHICLE BRAKE SYSTEM

BACKGROUND OF THE INVENTION

The present invention relates to a hydraulic pressure control unit for a straddle-type vehicle brake system and to a straddle-type vehicle brake system that includes the hydraulic pressure control unit.

A hydraulic pressure control unit for an anti-lock braking operation of a straddle-type vehicle brake system has been known. The hydraulic pressure control unit includes a base body formed with: a master cylinder port to which a fluid pipe communicating with a master cylinder of the straddle-type vehicle brake system is connected; a wheel cylinder port to which a fluid pipe communicating with a wheel cylinder of the straddle-type vehicle brake system is connected; a primary channel that communicates the master cylinder port and the wheel cylinder port via an inlet valve; and a secondary channel from which a brake fluid in the wheel cylinder is released to the master cylinder via an outlet valve. In a secondary channel, an accumulator is provided upstream of a plunger pump, and the accumulator and the plunger pump are sequentially arranged. The straddle-type vehicle brake system also includes plural systems of hydraulic circuits (for example, a front-wheel hydraulic circuit and a rear-wheel hydraulic circuit), and the base body thereof is formed with plural groups of the master cylinder port, the wheel cylinder port, the primary channel, and the secondary channel. The accumulator and the plunger pump are provided in each of the plural secondary channels (for example, see WO 2009/051008).

SUMMARY OF THE INVENTION

In the conventional straddle-type vehicle brake system, pulsations generated in conjunction with driving of the plunger pump are transmitted to the brake fluid in the master cylinder, which possibly gives a rider a sense of discomfort. In order to reduce such pulsations, it can be proposed that an auxiliary plunger pump is added to the hydraulic pressure control unit and the auxiliary plunger pump is driven in different phases from the plunger pump. However, since the base body is originally provided with components of the plural systems of the hydraulic circuits, it is difficult to secure a space for the additional auxiliary plunger, and the hydraulic pressure control unit has to be extremely enlarged. In addition, in the conventional straddle-type vehicle brake system, there is a case where, in order to secure a conveyance force of the plunger pump, a motor as a drive source of the plunger pump has to be enlarged for high output. In order to suppress such high output, it can be proposed that a low-output motor can be adopted by adding the auxiliary plunger pump and driving the auxiliary plunger pump and the plunger pump by a common motor. However, since the base body is originally provided with the components of the plural systems of the hydraulic circuits, it is difficult to secure the space for the additional auxiliary plunger, and the hydraulic pressure control unit has to be extremely enlarged. That is, in the conventional straddle-type vehicle brake system, it is difficult to add the auxiliary plunger pump while the extreme enlargement of the hydraulic pressure control unit is suppressed. Compared to other vehicles (for example, an automobile, a truck, and the like), a strict limitation on a mounting space of the hydraulic pressure control unit is imposed on a straddle-type vehicle, and an influence of such difficulty is significant.

The present invention has been made in view of the above-described problem as the background and therefore has a purpose of obtaining a hydraulic pressure control unit in which an auxiliary plunger pump can be added while extreme enlargement of the hydraulic pressure control unit is suppressed. The present invention also has a purpose of obtaining a straddle-type vehicle brake system that includes such a hydraulic pressure control unit.

Solution to Problem

A hydraulic pressure control unit according to the present invention is a hydraulic pressure control unit for an anti-lock braking operation of a straddle-type vehicle brake system, and includes: a base body formed with: a first master cylinder port to which a fluid pipe communicating with a first master cylinder is connected; a first wheel cylinder port to which a fluid pipe communicating with a first wheel cylinder is connected; a first primary channel communicating the first master cylinder port and the first wheel cylinder port via a first inlet valve; a first secondary channel through which a brake fluid in the first wheel cylinder is released to the first master cylinder via a first outlet valve; a second master cylinder port to which a fluid pipe communicating with a second master cylinder is connected; a second wheel cylinder port to which a fluid pipe communicating with a second wheel cylinder is connected; a second primary channel communicating the second master cylinder port and the second wheel cylinder port via a second inlet valve; and a second secondary channel through which the brake fluid in the second wheel cylinder is released to the second master cylinder via a second outlet valve; a first plunger pump and an auxiliary plunger pump provided in the first secondary channel; a first accumulator that stores the brake fluid in a portion of the first secondary channel upstream of the first plunger pump and the auxiliary plunger pump; a second plunger pump provided in the second secondary channel; a second accumulator that stores the brake fluid in a portion of the secondary channel upstream of the second plunger pump; and a motor as a common drive source of the first plunger pump, the auxiliary plunger pump, and the second plunger pump. The motor is provided in an upright manner in a motor hole that is formed on a first surface of the base body. In the base body, a combination of the first plunger pump and the first accumulator and a combination of the second plunger pump and the second accumulator are separately provided on both sides of a reference surface including a center axis of the motor hole. The first plunger pump is accommodated in a first pump hole that penetrates the base body from a second surface to the motor hole, and the second surface constitutes one end of the base body in a first direction of the base body that is orthogonal to the reference surface. The second plunger pump is accommodated in a second pump hole that penetrates the base body from a third surface to the motor hole, and the third surface constitutes another end of the base body in the first direction. The first accumulator and the second accumulator are provided on a fourth surface constituting one end of the base body in a second direction of the base body that is parallel with the reference surface and is orthogonal to the center axis. The auxiliary plunger pump is accommodated in a third pump hole that penetrates the base body from the fourth surface to the motor hole.

A straddle-type vehicle brake system according to the present invention includes the above-described hydraulic pressure control unit.

In the hydraulic pressure control unit and the straddle-type vehicle brake system according to the present invention, the combination of the first plunger pump and the first accumulator and the combination of the second plunger pump and the second accumulator for the different system of the hydraulic circuit therefrom are separately provided on both of the sides of the reference surface including the center axis of the motor hole in the base body. The first plunger pump and the second plunger pump are separately provided on the second surface and the third surface constituting both of the ends of the base body in the first direction, and the first accumulator, the second accumulator, and the auxiliary plunger pump are provided on the fourth surface constituting the one end of the base body in the second direction. Therefore, the base body can be made compact by dispersing distribution of a reaction force, which is received by an output shaft of the motor, around the shaft and simplifying the channels formed in the base body.

DETAILED DESCRIPTION

Figure 1:
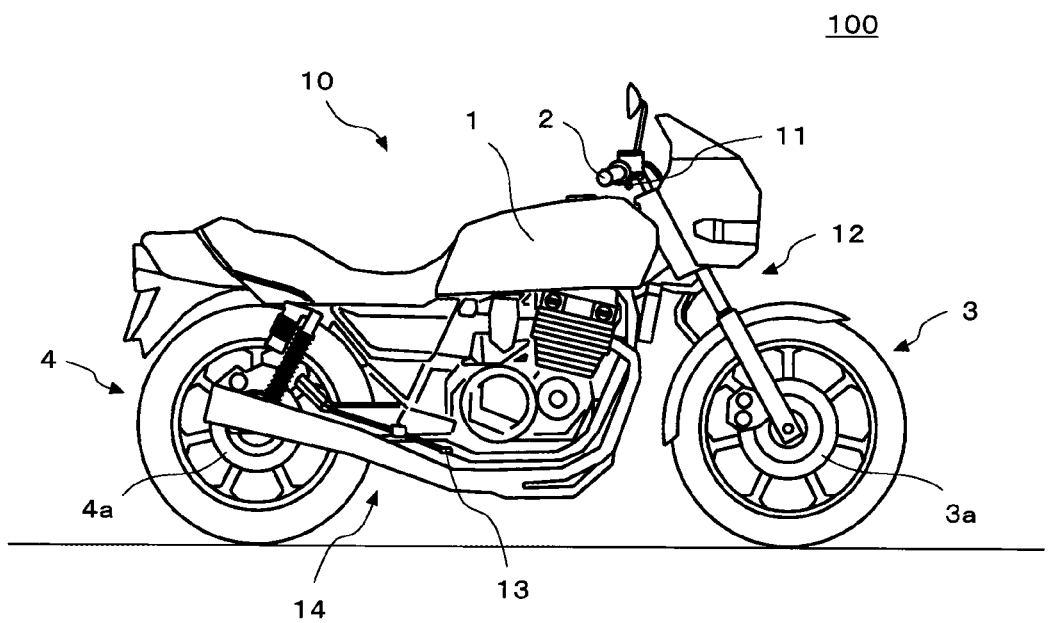
FIG. 1 is a configuration diagram of a straddle-type vehicle on which a straddle-type vehicle brake system according to an embodiment of the present invention is mounted.

A description will hereinafter be made on a hydraulic pressure control unit and a straddle-type vehicle brake system according to the present invention with reference to the drawings.

Note that the following description will be made on the case where the straddle-type vehicle brake system is mounted on a two-wheeled motor vehicle; however, the straddle-type vehicle brake system according to the present invention may be mounted on a straddle-type vehicle (for example, a three-wheeled motor vehicle, a bicycle, or the like) other than the two-wheeled motor vehicle. In addition, the following description will be made on the case where the straddle-type vehicle brake system includes two systems of hydraulic circuits; however, the straddle-type vehicle brake system may include three or more systems of the hydraulic circuits.

A configuration, operation, and the like, which will be described below, constitute merely one example. Each of the hydraulic pressure control unit and the straddle-type vehicle brake system according to the present invention is not limited to a case with such a configuration, such operation, and the like. In the drawings, the same or similar members or portions will not be denoted by the same reference signs or will not be denoted by the reference sign in some cases. A detailed structure will appropriately be depicted in a simplified manner or will not be depicted.

A description will hereinafter be made on a straddle-type vehicle brake system according to an embodiment.

<Configuration and Operation of Straddle-Type Vehicle Brake System>

A description will be made on a configuration and operation of the straddle-type vehicle brake system according to the embodiment.

Figure 2:
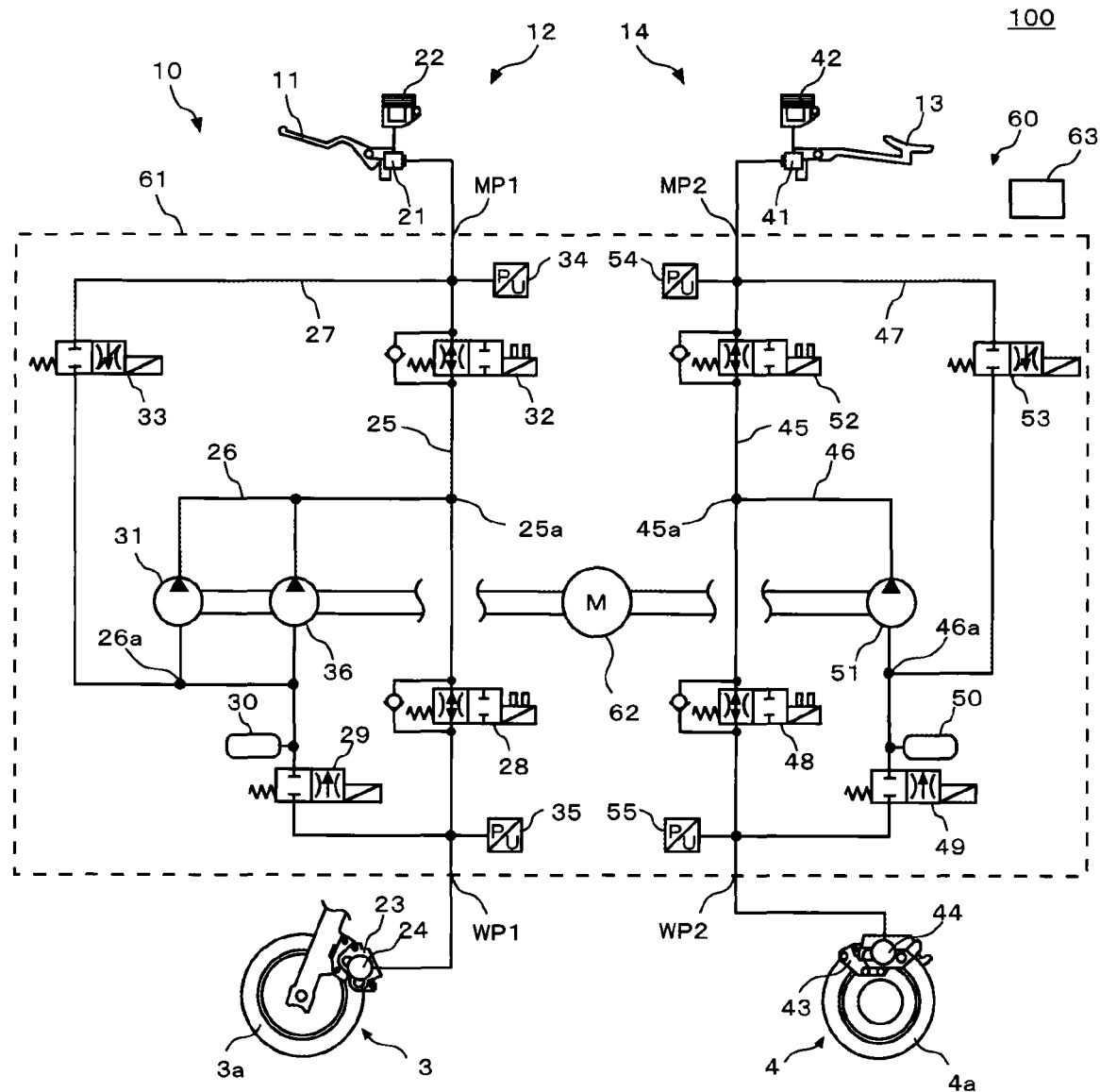
FIG. 2 is a configuration diagram of the straddle-type vehicle brake system according to the embodiment of the present invention.

FIG. 1 is a configuration diagram of a straddle-type vehicle on which the straddle-type vehicle brake system according to the embodiment of the present invention is mounted. FIG. 2 is a configuration diagram of the straddle-type vehicle brake system according to the embodiment of the present invention.

As depicted in FIG. 1 and FIG. 2, a straddle-type vehicle brake system 10 is mounted on a straddle-type vehicle 100. The straddle-type vehicle 100 includes: a trunk 1; a handlebar 2 that is held by the trunk 1 in a freely turnable manner; a front wheel 3 that is held by the trunk 1 in a freely turnable manner with the handlebar 2; and a rear wheel 4 that is held by the trunk 1 in a freely rotatable manner.

The straddle-type vehicle brake system 10 includes: a brake lever 11; a first hydraulic circuit 12 that is filled with a brake fluid; a brake pedal 13; and a second hydraulic circuit 14 that is filled with the brake fluid. The brake lever 11 is provided on the handlebar 2 and is operated by a user's hand. The first hydraulic circuit 12 causes a rotor 3a that rotates with the front wheel 3 to generate a braking force corresponding to an operation amount of the brake lever 11. The brake pedal 13 is provided in a lower portion of the trunk 1 and is operated by the user's foot. The second hydraulic circuit 14 causes a rotor 4a that rotates with the rear wheel 4 to generate the braking force corresponding to the operation amount of the brake pedal 13. The brake pedal 13 may be a different brake lever from the brake lever 11 provided on the handlebar 2. The first hydraulic circuit 12 may cause the rotor 4a, which rotates with the rear wheel 4, to generate the braking force corresponding to the operation amount of the brake lever 11, and the second hydraulic circuit 14 may cause the rotor 3a, which rotates with the front wheel 3, to generate the braking force corresponding to the operation amount of the brake pedal 13 or the operation amount of the different brake lever from the brake lever 11 provided on the handlebar 2.

The first hydraulic circuit 12 includes: a first master cylinder 21 that includes a piston (not depicted) therein; a first reservoir 22 that is attached to the first master cylinder 21; a first brake caliper 23 that is held by the trunk 1 and has a brake pad (not depicted); and a first wheel cylinder 24 that operates the brake pad (not depicted) of the first brake caliper 23.

In the first hydraulic circuit 12, the first master cylinder 21 and the first wheel cylinder 24 communicate with each other via a fluid pipe connected between the first master cylinder 21 and a first master cylinder port MP1 formed in a base body 61, a first primary channel 25 formed in the base body 61, and a fluid pipe connected between the first wheel cylinder 24 and a first wheel cylinder port WP1 formed in the base body 61. The base body 61 is also formed with a first secondary channel 26. The brake fluid in the first wheel cylinder 24 is released to a first primary channel intermediate portion 25a as an intermediate portion of the first primary channel 25 via the first secondary channel 26. The base body 61 is further formed with a first booster channel 27. The brake fluid in the first master cylinder 21 is supplied to a first secondary channel intermediate portion 26a as an intermediate portion of the first secondary channel 26 via the first booster channel 27. The first booster channel 27 corresponds to the "booster channel" in the present invention.

In a region of the first primary channel 25 that is on the first wheel cylinder 24 side of the first primary channel intermediate portion 25a, a first inlet valve 28 is provided, and a flow rate of the brake fluid flowing through the region is controlled by an opening/closing operation of the first inlet valve 28. In a region of the first secondary channel 26 upstream of the first secondary channel intermediate portion 26a, a first outlet valve 29 and a first accumulator 30 that stores the brake fluid are sequentially provided from the upstream side, and the flow rate of the brake fluid flowing through the region is controlled by the opening/closing operation of the first outlet valve 29. In a region of the first secondary channel 26 downstream of the first secondary channel intermediate portion 26a, a first plunger pump 31 is provided. In a region of the first primary channel 25 that is on the first master cylinder 21 side of the first primary channel intermediate portion 25a, a first switching valve 32 is provided, and the flow rate of the brake fluid flowing through the region is controlled by the opening/closing operation of the first switching valve 32. The first booster channel 27 is provided with a first booster valve 33, and the flow rate of the brake fluid flowing through the first booster channel 27 is controlled by the opening/closing operation of the first booster valve 33. In a region of the first primary channel 25 that is on the first master cylinder 21 side of the first switching valve 32, a first master cylinder hydraulic pressure sensor 34 is provided to detect a hydraulic pressure of the brake fluid in the first master cylinder 21. In a region of the first primary channel 25 that is on the first wheel cylinder 24 side of the first inlet valve 28, a first wheel cylinder hydraulic pressure sensor 35 is provided to detect the hydraulic pressure of the brake fluid in first wheel cylinder 24. The first booster valve 33 corresponds to the "booster valve" in the present invention.

That is, the first primary channel 25 communicates the first master cylinder port MP1 and the first wheel cylinder port WP1 via the first inlet valve 28. The first secondary channel 26 is a channel defined as a part or all of a channel from which the brake fluid in the first wheel cylinder 24 is released to the first master cylinder 21 via the first outlet valve 29. The first booster channel 27 is a channel defined as a part or all of a channel through which the brake fluid in the first master cylinder 21 is supplied to a portion of the first secondary channel 26 upstream of the first plunger pump 31 via the first booster valve 33.

The second hydraulic circuit 14 includes: a second master cylinder 41 that includes a piston (not depicted) therein; a second reservoir 42 that is attached to the second master cylinder 41; a second brake caliper 43 that is held by the trunk 1 and has a brake pad (not depicted); and a second wheel cylinder 44 that operates the brake pad (not depicted) of the second brake caliper 43.

In the second hydraulic circuit 14, the second master cylinder 41 and the second wheel cylinder 44 communicate with each other via a fluid pipe connected between the second master cylinder 41 and a second master cylinder port MP2 formed in a base body 61, a second primary channel 45 formed in the base body 61, and a fluid pipe connected between the second wheel cylinder 44 and a second wheel cylinder port WP2 formed in the base body 61. The base body 61 is also formed with a second secondary channel 46. The brake fluid in the second wheel cylinder 44 is released to a second primary channel intermediate portion 45a as an intermediate portion of the second primary channel 45 via the second secondary channel 46. The base body 61 is further formed with a second booster channel 47. The brake fluid in the second master cylinder 41 is supplied to a second secondary channel intermediate portion 46a as an intermediate portion of the second secondary channel 46 via the second booster channel 47.

In a region of the second primary channel 45 that is on the second wheel cylinder 44 side of the second primary channel intermediate portion 45a, a second inlet valve 48 is provided, and the flow rate of the brake fluid flowing through the region is controlled by the opening/closing operation of the second inlet valve 48. In a region of the second secondary channel 46 upstream of the second secondary channel intermediate portion 46a, a second outlet valve 49 and a second accumulator 50 that stores the brake fluid are sequentially provided from the upstream side, and the flow rate of the brake fluid flowing through the region is controlled by the opening/closing operation of the second outlet valve 49. In a region of the second secondary channel 46 downstream of the second secondary channel intermediate portion 46a, a second plunger pump 51 is provided. In a region of the second primary channel 45 that is on the second master cylinder 41 side of the second primary channel intermediate portion 45a, a second switching valve 52 is provided, and the flow rate of the brake fluid flowing through the region is controlled by the opening/closing operation of the second switching valve 52. The second booster channel 47 is provided with a second booster valve 53, and the flow rate of the brake fluid flowing through the second booster channel 47 is controlled by the opening/closing operation of the second booster valve 53. In a region of the second primary channel 45 that is on the second master cylinder 41 side of the second switching valve 52, a second master cylinder hydraulic pressure sensor 54 is provided to detect the hydraulic pressure of the brake fluid in the second master cylinder 41. In a region of the second primary channel 45 that is on the second wheel cylinder 44 side of the second inlet valve 48, a second wheel cylinder hydraulic pressure sensor 55 is provided to detect the hydraulic pressure of the brake fluid in the second wheel cylinder 44.

That is, the second primary channel 45 communicates the second master cylinder port MP2 and the second wheel cylinder port WP2 via the second inlet valve 48. The second secondary channel 46 is a channel defined as a part or all of a channel from which the brake fluid in the second wheel cylinder 44 is released to the second master cylinder 41 via the second outlet valve 49. The second booster channel 47 is a channel defined as a part or all of a channel through which the brake fluid in the second master cylinder 41 is supplied to a portion of the second secondary channel 46 upstream of the second plunger pump 51 via the second booster valve 53.

Each of the first inlet valve 28 and the second inlet valve 48 is an electromagnetic valve that is switched from being opened to being closed and thereby blocks the flow of the brake fluid at an installed position when being changed from an unenergized state to an energized state, for example. Each of the first outlet valve 29 and the second outlet valve 49 is an electromagnetic valve that is switched from being closed to being opened and thereby allows the flow of the brake fluid toward the first secondary channel intermediate portion 26a or the second secondary channel intermediate portion 46a via an installed position when being changed from the unenergized state to the energized state, for example. Each of the first switching valve 32 and the second switching valve 52 is an electromagnetic valve that is switched from being opened to being closed and thereby blocks the flow of the brake fluid at an installed position when being changed from the unenergized state to the energized state, for example. Each of the first booster valve 33 and the second booster valve 53 is an electromagnetic valve that is switched from being closed to being opened and thereby allows the flow of the brake fluid toward the first secondary channel intermediate portion 26a or the second secondary channel intermediate portion 46a via an installed position when being changed from the unenergized state to the energized state, for example.

In the first hydraulic circuit 12, an auxiliary plunger pump 36 is provided in parallel with the first plunger pump 31. The auxiliary plunger pump 36 may be provided in series with the first plunger pump 31. The first plunger pump 31 and the auxiliary plunger pump 36 in the first hydraulic circuit 12 and the second plunger pump 51 in the second hydraulic circuit 14, the system of which differs from the first hydraulic circuit 12, are driven by a common motor 62.

A hydraulic pressure control unit 60 is configured to include: the base body 61; and members (the first inlet valve 28, the first outlet valve 29, the first accumulator 30, the first plunger pump 31, the first switching valve 32, the first booster valve 33, the first master cylinder hydraulic pressure sensor 34, the first wheel cylinder hydraulic pressure sensor 35, the auxiliary plunger pump 36, the second inlet valve 48, the second outlet valve 49, the second accumulator 50, the second plunger pump 51, the second switching valve 52, the second booster valve 53, the second master cylinder hydraulic pressure sensor 54, the second wheel cylinder hydraulic pressure sensor 55, the motor 62, and the like) provided in the base body 61; and a controller (ECU) 63.

The controller 63 may be provided as one unit or may be divided into plural units. The controller 63 may be attached to the base body 61 or may be attached to the member other than the base body 61. The controller 63 may partially or entirely be constructed of a microcomputer, a microprocessor unit, or the like, may be constructed of a member in which firmware or the like can be updated, or may be a program module or the like that is executed by a command from a CPU or the like, for example.

For example, in a normal state, the controller 63 controls the first inlet valve 28, the first outlet valve 29, the first switching valve 32, the first booster valve 33, the second inlet valve 48, the second outlet valve 49, the second switching valve 52, and the second booster valve 53 in the unenergized states. When the brake lever 11 is operated in such a state, in the first hydraulic circuit 12, the piston (not depicted) in the first master cylinder 21 is pressed to increase the hydraulic pressure of the brake fluid in the first wheel cylinder 24, the brake pad (not depicted) of the first brake caliper 23 is pressed against the rotor 3a of the front wheel 3, and the front wheel 3 is thereby braked. Meanwhile, when the brake pedal 13 is operated, in the second hydraulic circuit 14, the piston (not depicted) in the second master cylinder 41 is pressed to increase the hydraulic pressure of the brake fluid in the second wheel cylinder 44, the brake pad (not depicted) of the second brake caliper 43 is pressed against the rotor 4a of the rear wheel 4, and the rear wheel 4 is thereby braked.

The controller 63 receives output from each of the sensors (the first master cylinder hydraulic pressure sensor 34, the first wheel cylinder hydraulic pressure sensor 35, the second master cylinder hydraulic pressure sensor 54, the second wheel cylinder hydraulic pressure sensor 55, a wheel speed sensor, an acceleration sensor, and the like). In response to those types of the output, the controller 63 outputs a command that governs operations of the motor 62, each of the valves, and the like, so as to perform a pressure reducing control operation, a pressure boosting control operation, or the like.

For example, in the case where the hydraulic pressure of the brake fluid in the first wheel cylinder 24 of the first hydraulic circuit 12 is excessive or is possibly excessive, the controller 63 performs the operation to reduce the hydraulic pressure of the brake fluid in the first wheel cylinder 24 of the first hydraulic circuit 12. At the time, the controller 63 drives the motor 62 while controlling the first inlet valve 28 in the energized state, controlling the first outlet valve 29 in the energized state, controlling the first switching valve 32 in the unenergized state, and controlling the first booster valve 33 in the unenergized state. Meanwhile, in the case where the hydraulic pressure of the brake fluid in the second wheel cylinder 44 of the second hydraulic circuit 14 is excessive or is possibly excessive, the controller 63 performs the operation to reduce the hydraulic pressure of the brake fluid in the second wheel cylinder 44 of the second hydraulic circuit 14. At the time, the controller 63 drives the motor 62 while controlling the second inlet valve 48 in the energized state, controlling the second outlet valve 49 in the energized state, controlling the second switching valve 52 in the unenergized state, and controlling the second booster valve 53 in the unenergized state.

For example, in the case where the hydraulic pressure of the brake fluid in the first wheel cylinder 24 of the first hydraulic circuit 12 is short or is possibly short, the controller 63 performs the operation to increase the hydraulic pressure of the brake fluid in the first wheel cylinder 24 of the first hydraulic circuit 12. At the time, the controller 63 drives the motor 62 while controlling the first inlet valve 28 in the unenergized state, controlling the first outlet valve 29 in the unenergized state, controlling the first switching valve 32 in the energized state, and controlling the first booster valve 33 in the energized state. In the case where the hydraulic pressure of the brake fluid in the second wheel cylinder 44 of the second hydraulic circuit 14 is short or is possibly short, the controller 63 performs the operation to increase the hydraulic pressure of the brake fluid in the second wheel cylinder 44 of the second hydraulic circuit 14. At the time, the controller 63 drives the motor 62 while controlling the second inlet valve 48 in the unenergized state, controlling the second outlet valve 49 in the unenergized state, controlling the second switching valve 52 in the energized state, and controlling the second booster valve 53 in the energized state.

That is, the hydraulic pressure control unit 60 can perform an anti-lock braking operation of the first hydraulic circuit 12 by controlling the hydraulic pressure of the brake fluid in the first wheel cylinder 24. The hydraulic pressure control unit 60 can also perform the anti-lock braking operation of the second hydraulic circuit 14 by controlling the hydraulic pressure of the brake fluid in the second wheel cylinder 44. In addition, the hydraulic pressure control unit 60 can perform an automatic pressure boosting operation of the first hydraulic circuit 12 by controlling the hydraulic pressure of the brake fluid in the first wheel cylinder 24. The hydraulic pressure control unit 60 can also perform the automatic pressure boosting operation of the second hydraulic circuit 14 by controlling the hydraulic pressure of the brake fluid in the second wheel cylinder 44.

<Detailed Configuration of Hydraulic Pressure Control Unit>

A detailed description will be made on a configuration of the hydraulic pressure control unit for the straddle-type vehicle brake system according to the embodiment.

Figure 3:
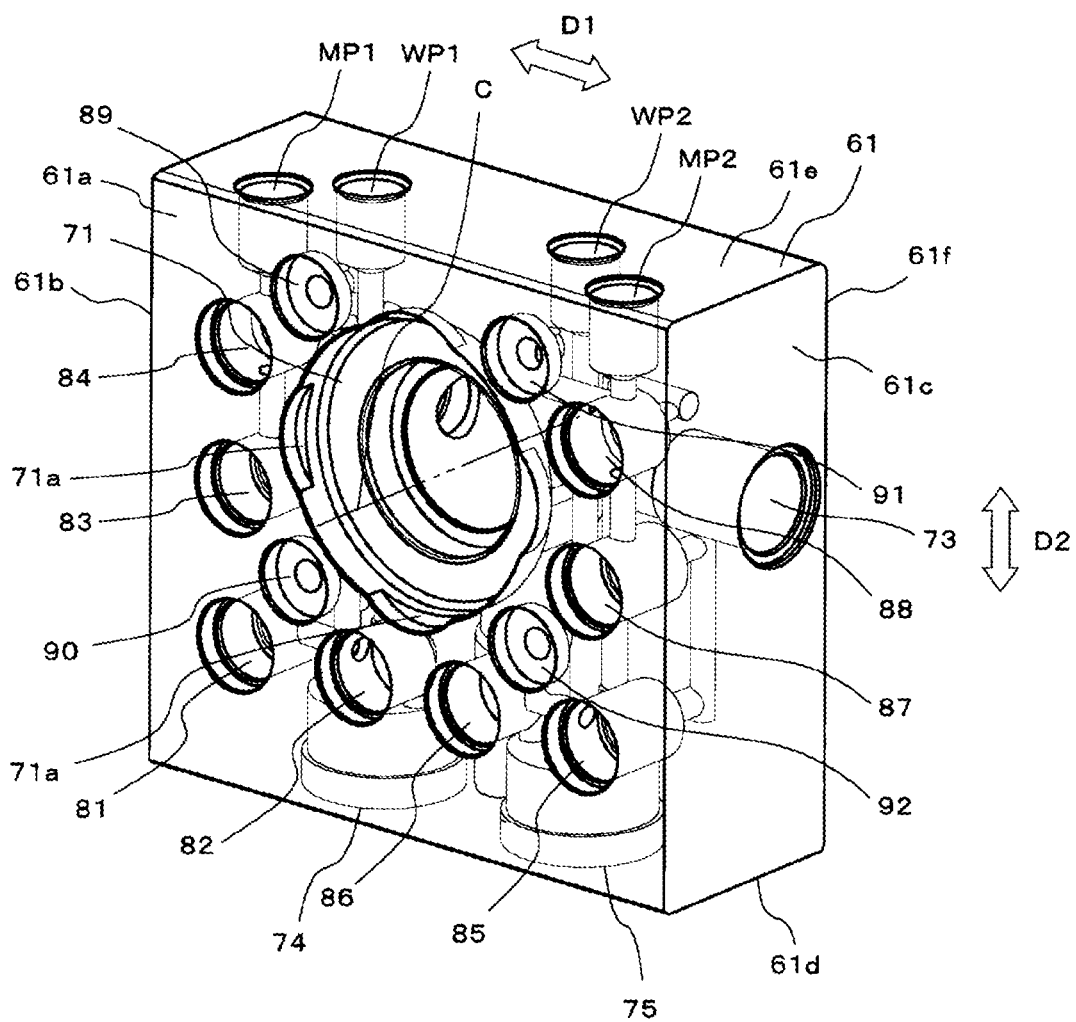
FIG. 3 is a perspective view of a base body of a hydraulic pressure control unit in the straddle-type vehicle brake system according to the embodiment of the present invention.
Figure 4:
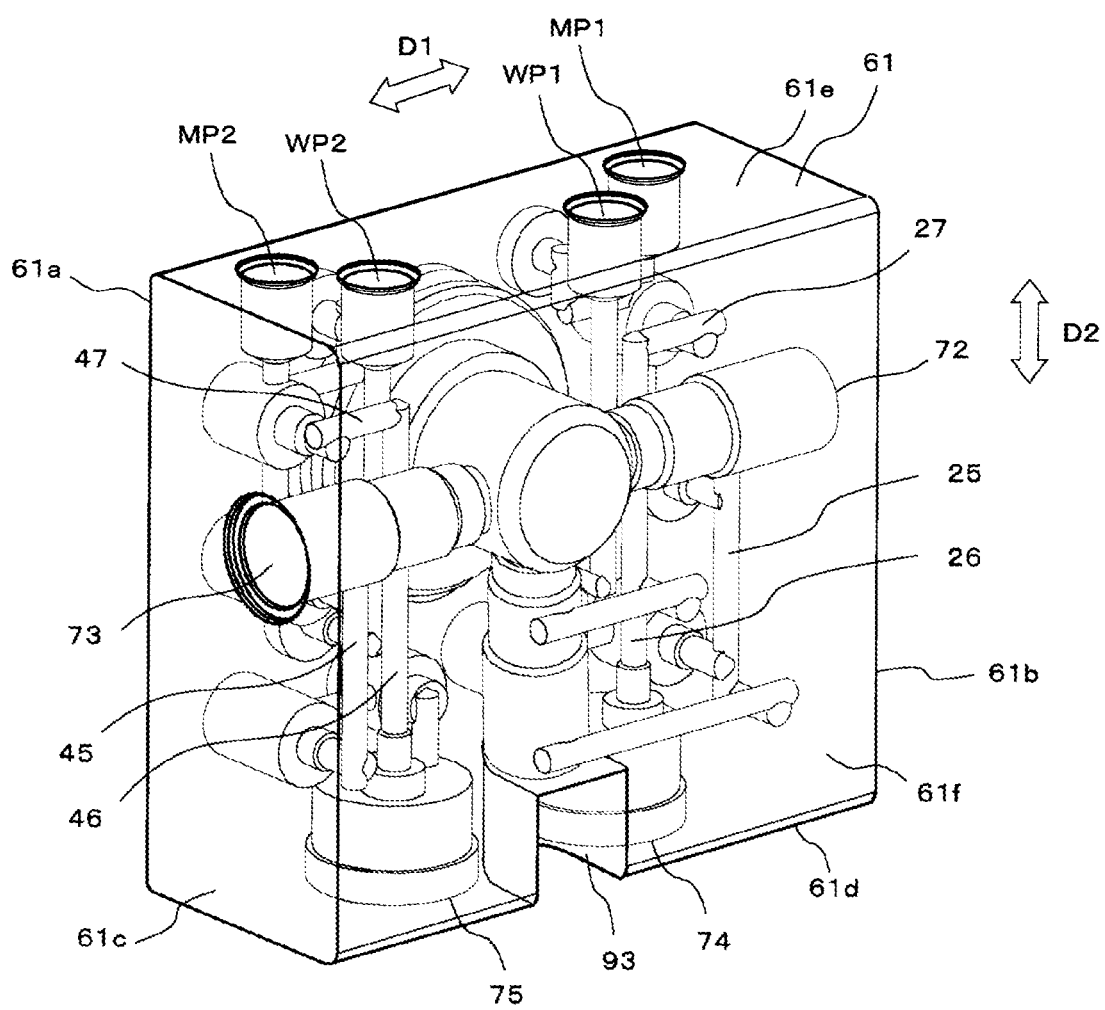
FIG. 4 is another perspective view of the base body of the hydraulic pressure control unit in the straddle-type vehicle brake system according to the embodiment of the present invention.
Figure 5:
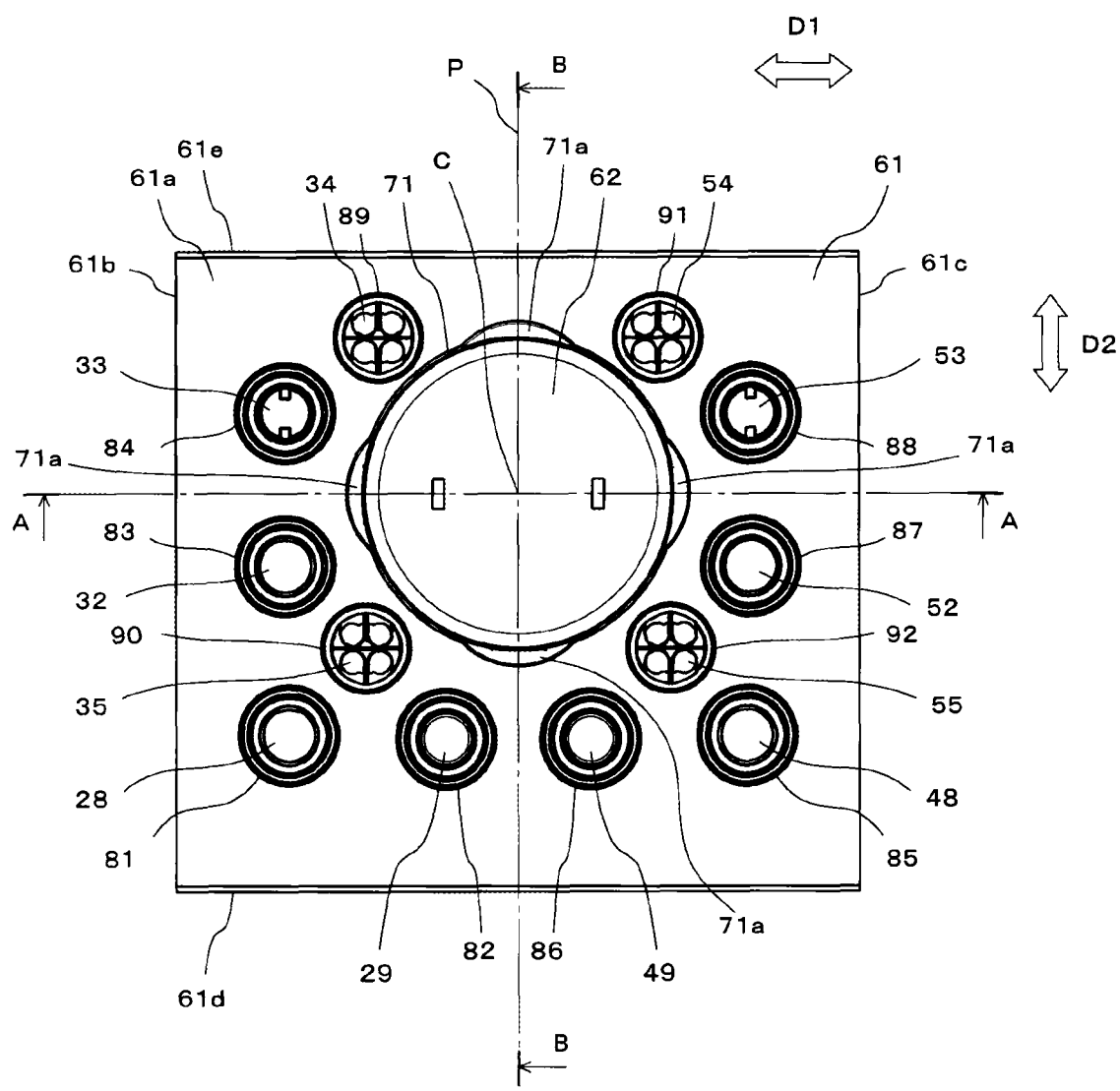
FIG. 5 is a plan view of a state where each member is attached to the base body of the hydraulic pressure control unit in the straddle-type vehicle brake system according to the embodiment of the present invention.
Figure 6:
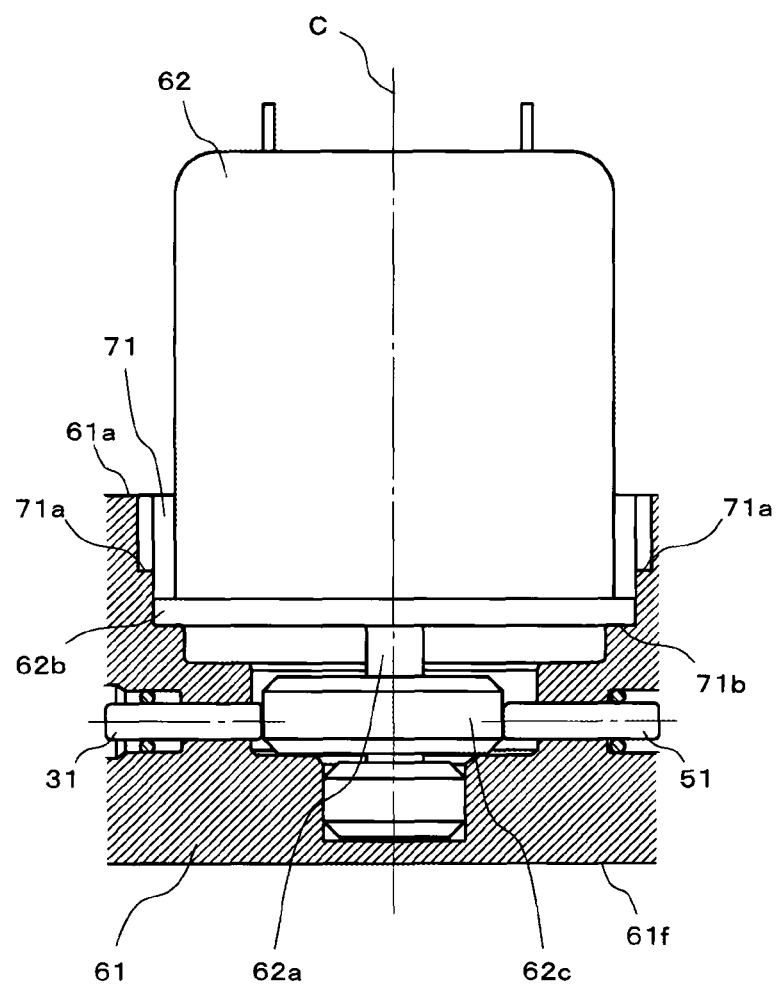
FIG. 6 is a partial cross-sectional view that is taken along line A-A in FIG. 5.
Figure 7:
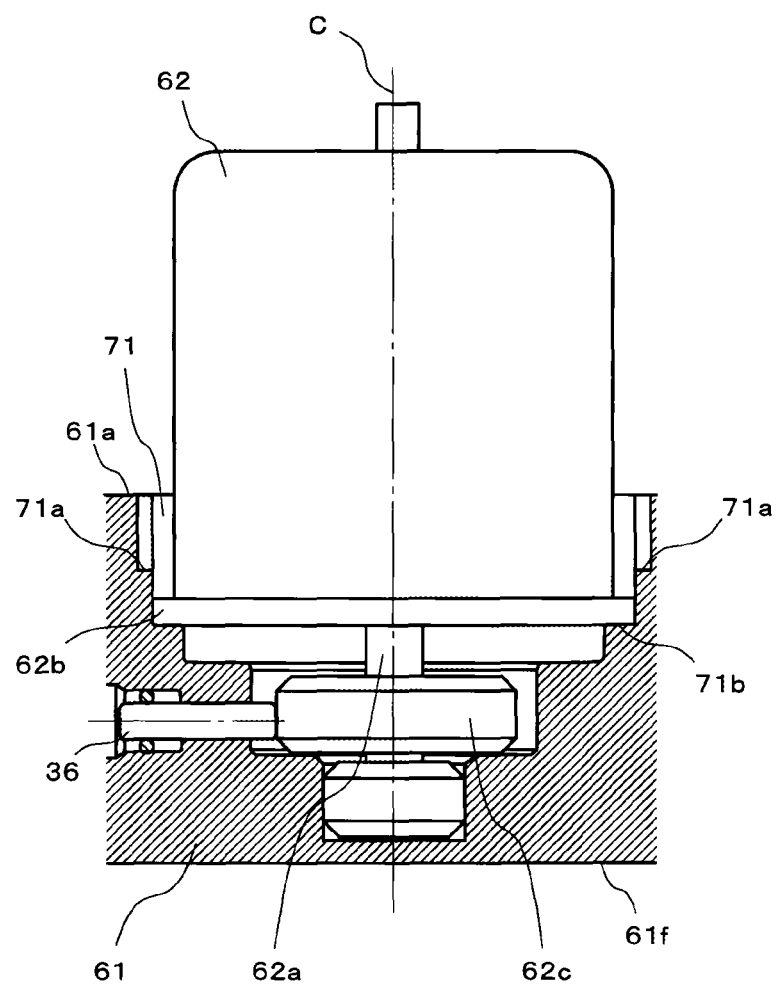
FIG. 7 is a partial cross-sectional view that is taken along line B-B in FIG. 5.

FIG. 3 and FIG. 4 are perspective views of the base body of the hydraulic pressure control unit in the straddle-type vehicle brake system according to the embodiment of the present invention. FIG. 5 is a plan view of a state where each of the members is attached to the base body of the hydraulic pressure control unit in the straddle-type vehicle brake system according to the embodiment of the present invention. FIG. 6 is a partial cross-sectional view that is taken along line A-A in FIG. 5. FIG. 7 is a partial cross-sectional view that is taken along line B-B in FIG. 5.

As depicted in FIG. 3 to FIG. 5, the base body 61 has a substantially rectangular-parallelepiped shape, for example. More specifically, the base body 61 has: a first surface 61a; a second surface 61b as a side surface of the first surface 61a; a third surface 61c opposing the second surface 61b; a fourth surface 61d and a fifth surface 61e as side surfaces that oppose each other in a different direction from the second surface 61b and the third surface 61c; and a sixth surface 61f opposing the first surface 61a. Each of the surfaces may include a step or a curved surface.

The first surface 61a is provided with a bottomed motor hole 71, and the motor 62 is inserted and provided in an upright manner in the motor hole 71. The second surface 61b is provided with a first pump hole 72 that penetrates the base body 61 up to the motor hole 71, and the first plunger pump 31 is embedded in the first pump hole 72. The third surface 61c is provided with a second pump hole 73 that penetrates the base body 61 up to the motor hole 71, and the second plunger pump 51 is embedded in the second pump hole 73. The fourth surface 61d is provided with a first accumulator hole 74 and a second accumulator hole 75, the first accumulator 30 is embedded in the first accumulator hole 74, and the second accumulator 50 is embedded in the second accumulator hole 75. The fifth surface 61e is provided with: the first master cylinder port MP1 to which the fluid pipe communicating with the first master cylinder 21 is connected; the first wheel cylinder port WP1 to which the fluid pipe communicating with the first wheel cylinder 24 is connected; the second master cylinder port MP2 to which the fluid pipe communicating with the second master cylinder 41 is connected; and the second wheel cylinder port WP2 to which the fluid pipe communicating with the second wheel cylinder 44 is connected.

In addition, on the first surface 61a, a first inlet valve hole 81, a first outlet valve hole 82, a first switching valve hole 83, a first booster valve hole 84, a second inlet valve hole 85, a second outlet valve hole 86, a second switching valve hole 87, and a second booster valve hole 88 are provided around the motor hole 71. The first inlet valve hole 81, the first outlet valve hole 82, the second outlet valve hole 86, and the second inlet valve hole 85 are sequentially provided in parallel between the second surface 61b and the third surface 61c. The first inlet valve hole 81, the first outlet valve hole 82, the second outlet valve hole 86, and the second inlet valve hole 85 are provided in parallel in a portion of the first surface 61a near the fourth surface 61d with the motor hole 71 being a reference. The first switching valve hole 83 and the first booster valve hole 84 are sequentially provided in parallel between the first inlet valve hole 81 and the fifth surface 61e. The second switching valve hole 87 and the second booster valve hole 88 are sequentially provided in parallel between the second inlet valve hole 85 and the fifth surface 61e.

The first inlet valve 28 is embedded in the first inlet valve hole 81 in a manner to be able to open or close the first primary channel 25. The first outlet valve 29 is embedded in the first outlet valve hole 82 in a manner to be able to open or close the first secondary channel 26. The first switching valve 32 is embedded in the first switching valve hole 83 in a manner to be able to open or close the first primary channel 25. The first booster valve 33 is embedded in the first booster valve hole 84 in the manner to be able to open or close the first booster channel 27. The second inlet valve 48 is embedded in the second inlet valve hole 85 in the manner to be able to open or close the second primary channel 45. The second outlet valve 49 is embedded in the second outlet valve hole 86 in a manner to be able to open or close the second secondary channel 46. The second switching valve 52 is embedded in the second switching valve hole 87 in the manner to be able to open or close the second primary channel 45. The second booster valve 53 is embedded in the second booster valve hole 88 in the manner to be able to open or close the second booster channel 47.

Furthermore, on the first surface 61a, a first master cylinder hydraulic pressure sensor hole 89, a first wheel cylinder hydraulic pressure sensor hole 90, a second master cylinder hydraulic pressure sensor hole 91, and a second wheel cylinder hydraulic pressure sensor hole 92 are provided around the motor hole 71. The first master cylinder hydraulic pressure sensor hole 89 and the first wheel cylinder hydraulic pressure sensor hole 90 are disposed near the second surface 61b with the motor hole 71 being the reference. The second master cylinder hydraulic pressure sensor hole 91 and the second wheel cylinder hydraulic pressure sensor hole 92 are disposed near the third surface 61c with the motor hole 71 being the reference. The first master cylinder hydraulic pressure sensor hole 89 and the second master cylinder hydraulic pressure sensor hole 91 are disposed between the motor hole 71 and the fifth surface 61e, the first wheel cylinder hydraulic pressure sensor hole 90 is disposed between the motor hole 71 and the first inlet valve hole 81, and the second wheel cylinder hydraulic pressure sensor hole 92 is disposed between the motor hole 71 and the second inlet valve hole 85.

The first master cylinder hydraulic pressure sensor 34 is embedded in the first master cylinder hydraulic pressure sensor hole 89 in a manner to be able to detect the hydraulic pressure of the brake fluid in the first master cylinder 21. The first wheel cylinder hydraulic pressure sensor 35 is embedded in the first wheel cylinder hydraulic pressure sensor hole 90 in a manner to be able to detect the hydraulic pressure of the brake fluid in the first wheel cylinder 24. The second master cylinder hydraulic pressure sensor 54 is embedded in the second master cylinder hydraulic pressure sensor hole 91 in a manner to be able to detect the hydraulic pressure of the brake fluid in the second master cylinder 41. The second wheel cylinder hydraulic pressure sensor 55 is embedded in the second wheel cylinder hydraulic pressure sensor hole 92 in a manner to be able to detect the hydraulic pressure of the brake fluid in the second wheel cylinder 44.

That is, in the case where a reference surface P including a center axis C of the motor hole 71 is defined as depicted in FIG. 5, the second surface 61b and the third surface 61c are surfaces constituting both ends in a first direction D1 that is orthogonal to the reference surface P, and the fourth surface 61d and the fifth surface 61e are surfaces parallel with the reference surface P and constituting both ends in a second direction D2 that is orthogonal to the center axis C. Moreover, the members (the first inlet valve 28, the first outlet valve 29, the first accumulator 30, the first plunger pump 31, the first switching valve 32, the first booster valve 33, the first master cylinder hydraulic pressure sensor 34, and the first wheel cylinder hydraulic pressure sensor 35) constituting the first hydraulic circuit 12 and the members (the second inlet valve 48, the second outlet valve 49, the second accumulator 50, the second plunger pump 51, the second switching valve 52, the second booster valve 53, the second master cylinder hydraulic pressure sensor 54, and the second wheel cylinder hydraulic pressure sensor 55) constituting the second hydraulic circuit 14 are separately provided on both sides of the reference surface P.

As depicted in FIG. 4, the fourth surface 61d of the base body 61 is provided with a third pump hole 93 that penetrates the base body 61 up to the motor hole 71. In the first direction D1, the third pump hole 93 is disposed between the first accumulator hole 74 and the second accumulator hole 75. In the third pump hole 93, the auxiliary plunger pump 36 is disposed in a manner to be able to convey the brake fluid in the first secondary channel 26. For example, an axis of the third pump hole 93 is preferably parallel with the reference surface P. In addition, as depicted in FIG. 4, for example, an inner circumferential surface of the third pump hole 93 may partially be cut out up to the sixth surface 61f. With such a configuration, weight of the base body 61 is reduced, and assemblability of the auxiliary plunger pump 36 is improved.

As depicted in FIG. 3 and FIG. 5, a step 71a is formed on an inner circumferential surface of the motor hole 71, and the step 71a displaces the inner circumferential surface of the motor hole 71 in a direction away from an outer circumferential surface of the motor 62. For example, the steps 71a are arranged on the inner circumferential surface of the motor hole 71 at 90° pitch.

As depicted in FIG. 6 and FIG. 7, the motor 62 is inserted in the motor hole 71 in a state where an output shaft 62a of the motor 62 is located deep in the motor hole 71. A flange 62b is formed on the outer circumferential surface of the motor 62, and a seat 71b is formed on a deep side of the step 71a in the motor hole 71. The motor 62 is inserted until the flange 62b abuts the seat 71b, and is provided in the upright manner. In such a state, a jig is inserted in a space on the first surface 61a side of the step 71a in the motor hole 71, the step 71a is pressurized and deformed, and thus the flange 62b is fixed to the motor hole 71.

An eccentric body 62c that rotates with the output shaft 62a of the motor 62 is attached to the output shaft 62a of the motor 62. When the eccentric body 62c rotates, a plunger of the first plunger pump 31, a plunger of the auxiliary plunger pump 36, and a plunger of the second plunger pump 51 that are pressed against an outer circumferential surface of the eccentric body 62c reciprocate. As a result, the brake fluid is delivered from a suction side to a discharge side. The eccentric body 62c has the outer circumferential surface in such a shape (for example, a circular shape) that the plunger of the first plunger pump 31 and the plunger of the auxiliary plunger pump 36 reciprocate in mutually different phases.

<Effects of Straddle-Type Vehicle Brake System>

A description will be made on effects of the straddle-type vehicle brake system according to the embodiment.

In the hydraulic pressure control unit 60, a combination of the first plunger pump 31 and the first accumulator 30 and a combination of the second plunger pump 51 and the second accumulator 50 for the different system of the hydraulic circuit therefrom are separately provided on both of the sides of the reference surface P, which includes the center axis C of the motor hole 71, in the base body 61. The first plunger pump 31 and the second plunger pump 51 are separately provided in the second surface 61b and the third surface 61c constituting both of the ends of the base body 61 in the first direction D1. On the fourth surface 61d constituting the one end of the base body 61 in the second direction D2, the first accumulator 30, the second accumulator 50, and the auxiliary plunger pump 36 are provided. Thus, the base body 61 can be made compact by dispersing distribution of a reaction force, which is received by the output shaft 62a of the motor 62, around the shaft and simplifying the channels formed in the base body 61.

In The hydraulic pressure control unit 60, the third pump hole 93, in which the auxiliary plunger pump 36 is accommodated, is preferably located between the first accumulator 30 and the second accumulator 50 in the first direction D1. With such a configuration, even in the case where the base body 61 is made compact by disposing the first accumulator 30 between the first inlet valve 28 and the first outlet valve 29 and disposing the second accumulator 50 between the second inlet valve 48 and the second outlet valve 49 in the first direction D1, enlargement of the base body 61 can be suppressed by effectively using a space between the first accumulator 30 and the second accumulator 50.

In the hydraulic pressure control unit 60, the first master cylinder port MP1, the first wheel cylinder port WP1, the second master cylinder port MP2, and the second wheel cylinder port WP2 are preferably located on the side without the fourth surface 61d with the motor hole 71 being the reference in the second direction D2. With such a configuration, even in the case where the base body 61 is attached to the straddle-type vehicle 100 in a manner that the fourth surface 61d faces a gravitational force direction, air releasing performance of the auxiliary plunger pump 36 is secured.

The hydraulic pressure control unit 60 preferably includes the booster valve (the first booster valve 33) that is brought into an open state in the automatic pressure boosting operation of the straddle-type vehicle brake system 10. The base body 61 is preferably formed with the booster channel (the first booster channel 27), through which the brake fluid in the first master cylinder 21 is supplied to the portion of the first secondary channel 26 upstream of the first plunger pump 31 and the auxiliary plunger pump 36 via the booster valve. Particularly, in the case where the base body 61 is formed with the booster channel, it is necessary to arrange the members close to each other. In such a case, providing the third pump hole 93, in which the auxiliary plunger pump 36 is accommodated, in the fourth surface 61d of the base body 61 is particularly effective.

In the hydraulic pressure control unit 60, the first plunger pump 31 and the auxiliary plunger pump 36 are provided in parallel in the first secondary channel 26. The eccentric body 62c having the outer circumferential surface, which is eccentric with respect to the output shaft 62a of the motor 62, is attached to the motor 62. The output shaft 62a rotates while the plunger of the first plunger pump 31 and the plunger of the auxiliary plunger pump 36 abut the outer circumferential surface. In this way, the first plunger pump 31 and the auxiliary plunger pump 36 are preferably driven in the mutually different phases. With such a configuration, it is possible to suppress pulsations in the first hydraulic circuit 12 from being transferred to a braking operation section operated by the rider, which gives the rider a sense of discomfort.

In particular, the brake lever 11 of the straddle-type vehicle 100 is preferably coupled to the first master cylinder 21. In the case where the braking operation section operated by the rider is the brake lever 11, the rider is more likely to sense the pulsations when compared to the case where the braking operation section operated by the rider is the brake pedal 13. In such a case, driving the first plunger pump 31 and the auxiliary plunger pump 36 in the mutually different phases is particularly effective.

The description has been made so far on the embodiment. However, the present invention is not limited to the description of the embodiment. For example, the embodiment may only partially be implemented.

REFERENCE SIGNS LIST

1: Trunk
2: Handlebar
3: Front wheel
4: Rear wheel
10: Straddle-type vehicle brake system
11: Brake lever
12, 14: Hydraulic circuit
13: Brake pedal
21, 41: Master cylinder
24, 44: Wheel cylinder
25, 45: Primary channel
26, 46: Secondary channel
27, 47: Booster channel
28, 48: Inlet valve
29, 49: Outlet valve
30, 50: Accumulator
31, 51: Plunger pump
32, 52: Switching valve
33, 53: Booster valve
34, 54: Master cylinder hydraulic pressure sensor
35, 55: Wheel cylinder hydraulic pressure sensor
36: Auxiliary plunger pump
60: Hydraulic pressure control unit
61: Base body
62: Motor
63: Controller
71: Motor hole
72, 73, 93: Pump hole
74, 75: Accumulator hole
81, 85: Inlet valve hole
82, 86: Outlet valve hole
83, 87: Switching valve hole
84, 88: Booster valve hole
89, 91: Master cylinder hydraulic pressure sensor hole
90, 92: Wheel cylinder hydraulic pressure sensor hole
100: Straddle-type vehicle
MP1, MP2: Master cylinder port
WP1, WP2: Wheel cylinder port
C: Center axis
P: Reference surface
D1: First direction
D2: Second direction

What is claimed is:

1. A hydraulic pressure control unit (60) for an anti-lock braking operation of a straddle vehicle brake system (10), the hydraulic pressure control unit comprising:
a base body (61) formed with: a first master cylinder port (MP1) to which a fluid pipe communicating with a first master cylinder (21) is connected; a first wheel cylinder port (WP1) to which a fluid pipe communicating with a first wheel cylinder (24) is connected; a first primary channel (25) communicating the first master cylinder port (MP1) and the first wheel cylinder port (WP1) via a first inlet valve (28); a first secondary channel (26) through which a brake fluid in the first wheel cylinder (24) is released to the first master cylinder (21) via a first outlet valve (29); a second master cylinder port (MP2) to which a fluid pipe communicating with a second master cylinder (41) is connected; a second wheel cylinder port (WP2) to which a fluid pipe communicating with a second wheel cylinder (44) is connected; a second primary channel (45) communicating the second master cylinder port (MP2) and the second wheel cylinder port (WP2) via a second inlet valve (48); and a second secondary channel (46) through which the brake fluid in the second wheel cylinder (44) is released to the second master cylinder (41) via a second outlet valve (49);
a first plunger pump (31) and an auxiliary plunger pump (36) provided in the first secondary channel (26);
a first accumulator (30) that stores the brake fluid in a portion of the first secondary channel (26) upstream of the first plunger pump (31) and the auxiliary plunger pump (36);
a second plunger pump (51) provided in the second secondary channel (46);
a second accumulator (50) that stores the brake fluid in a portion of the second secondary channel (46) upstream of the second plunger pump (51); and
a motor (62) as a common drive source of the first plunger pump (31), the auxiliary plunger pump (36), and the second plunger pump (51), wherein
the motor (62) is provided in an upright manner in a motor hole (71) that is formed on a first surface (61a) of the base body (61);
in the base body (61), a combination of the first plunger pump (31) and the first accumulator (30) and a combination of the second plunger pump (51) and the second accumulator (50) are separately provided on both sides of a reference surface (P) including a center axis (C) of the motor hole (71);
the first plunger pump (31) is accommodated in a first pump hole (72) that penetrates the base body (61) from a second surface (61b) to the motor hole (71), the second surface (61b) constituting one end of the base body (61) in a first direction (D1) of the base body (61) that is orthogonal to the reference surface (P);
the second plunger pump (51) is accommodated in a second pump hole (73) that penetrates the base body (61) from a third surface (61c) to the motor hole (71), the third surface (61c) constituting another end of the base body (61) in the first direction (D1);
the first accumulator (30) and the second accumulator (50) are provided on a fourth surface (61d) constituting one end of the base body (61) in a second direction (D2) of the base body (61) that is parallel with the reference surface (P) and is orthogonal to the center axis (C); and
the auxiliary plunger pump (36) is accommodated in a third pump hole (93) that penetrates the base body (61) from the fourth surface (61d) to the motor hole (71).

2. The hydraulic pressure control unit according to claim 1, wherein in the first direction (D1), the third pump hole (93) is located between the first accumulator (30) and the second accumulator (50).

3. The hydraulic pressure control unit according to claim 1, wherein in the second direction (D2), the first master cylinder port (MP1), the first wheel cylinder port (WP1), the second master cylinder port (MP2), and the second wheel cylinder port (WP2) are located farther than the motor hole (71) from the fourth surface (61d).

4. The hydraulic pressure control unit according to claim 1 further comprising:
   a booster valve (33) brought into an open state in an automatic pressure boosting operation of the straddle vehicle brake system (10), wherein
   the base body (61) is formed with a booster channel (27), through which the brake fluid in the first master cylinder (21) is supplied to the portion of the first secondary channel (26) upstream of the first plunger pump (31) and the auxiliary plunger pump (36) via the booster valve (33).

5. The hydraulic pressure control unit according to claim 1, wherein
   the first plunger pump (31) and the auxiliary plunger pump (36) are provided in parallel in the first secondary channel (26), and
   an eccentric body (62c) having an outer circumferential surface, which is eccentric with respect to an output shaft (62a) of the motor (62), is attached to the motor (62), the output shaft (62a) rotates while a plunger of the first plunger pump (31) and a plunger of the auxiliary plunger pump (36) abut the outer circumferential surface, and the first plunger pump (31) and the auxiliary plunger pump (36) are thereby driven in mutually different phases.

6. The hydraulic pressure control unit according to claim 5, wherein a brake lever (11) of a straddle vehicle (100) is coupled to the first master cylinder (21).

7. A straddle vehicle brake system comprising:
   the hydraulic pressure control unit (60) according to claim 1.

8. The hydraulic pressure control unit according to claim 2, wherein in the second direction (D2), the first master cylinder port (MP1), the first wheel cylinder port (WP1), the second master cylinder port (MP2), and the second wheel cylinder port (WP2) are located farther than the motor hole (71) from the fourth surface (61d).

9. The hydraulic pressure control unit according to claim 8 further comprising:
   a booster valve (33) brought into an open state in an automatic pressure boosting operation of the straddle vehicle brake system (10), wherein
   the base body (61) is formed with a booster channel (27), through which the brake fluid in the first master cylinder (21) is supplied to the portion of the first secondary channel (26) upstream of the first plunger pump (31) and the auxiliary plunger pump (36) via the booster valve (33).

10. The hydraulic pressure control unit according to claim 9, wherein
    the first plunger pump (31) and the auxiliary plunger pump (36) are provided in parallel in the first secondary channel (26), and
    an eccentric body (62c) having an outer circumferential surface, which is eccentric with respect to an output shaft (62a) of the motor (62), is attached to the motor (62), the output shaft (62a) rotates while a plunger of the first plunger pump (31) and a plunger of the auxiliary plunger pump (36) abut the outer circumferential surface, and the first plunger pump (31) and the auxiliary plunger pump (36) are thereby driven in mutually different phases.

11. The hydraulic pressure control unit according to claim 10, wherein a brake lever (11) of a straddle vehicle (100) is coupled to the first master cylinder (21).

12. A straddle vehicle brake system comprising:
    the hydraulic pressure control unit (60) according to claim 11.

* * * * *